(12) United States Patent
Schaede et al.

(10) Patent No.: US 10,059,093 B2
(45) Date of Patent: Aug. 28, 2018

(54) INSPECTION SYSTEM FOR IN-LINE INSPECTION OF PRINTED MATERIAL PRODUCED ON AN INTAGLIO PRINTING PRESS

(75) Inventors: Johannes Georg Schaede, Würzburg (DE); Thomas Türke, Lonay (CH); Rolf Volkmar Schwitzky, Würzburg (DE)

(73) Assignee: KBA-NotaSys SA, Lausanne (CH)

( * ) Notice: Subject to any disclaimer, the term of this patent is extended or adjusted under 35 U.S.C. 154(b) by 933 days.

(21) Appl. No.: 13/806,896

(22) PCT Filed: Jun. 24, 2011

(86) PCT No.: PCT/IB2011/052791
§ 371 (c)(1),
(2), (4) Date: Jul. 26, 2013

(87) PCT Pub. No.: WO2011/161656
PCT Pub. Date: Dec. 29, 2011

(65) Prior Publication Data
US 2014/0218502 A1    Aug. 7, 2014

(30) Foreign Application Priority Data

Jun. 25, 2010 (EP) .................................. 10167431

(51) Int. Cl.
*B41F 33/00* (2006.01)
*H04N 7/18* (2006.01)
(Continued)

(52) U.S. Cl.
CPC .......... *B41F 33/0036* (2013.01); *B41F 9/021* (2013.01); *B41F 9/06* (2013.01);
(Continued)

(58) Field of Classification Search
None
See application file for complete search history.

(56) References Cited

U.S. PATENT DOCUMENTS

| 4,516,496 A | 5/1985 | Giori |
|---|---|---|
| 5,062,359 A | 11/1991 | Giori |

(Continued)

FOREIGN PATENT DOCUMENTS

| DE | 44 36 583 A1 | 4/1996 |
|---|---|---|
| DE | 20 2007 009 386 U1 | 10/2007 |

(Continued)

*Primary Examiner* — Kaitlin A Retallick
(74) *Attorney, Agent, or Firm* — Nixon & Vanderhye P.C.

(57) ABSTRACT

There is described an inspection system (50) for in-line inspection of sheet or web material on an intaglio printing press, wherein the inspection system comprises an optical quality control apparatus for carrying out inspection of a printed area on a printed side of the sheet or web material, the optical quality control apparatus including a camera system (55) with one or more camera units each comprising at least one line-scan camera (56) for scanning and acquiring an image of the printed area while the sheet or web material is being transported in the intaglio printing press past the camera system (55). A location of the at least one line-scan camera (56) in the intaglio printing press along a delivery path of the sheet or web material is such that cyclical vibrations that spread periodically throughout the intaglio printing press during operation of the intaglio printing press do not occur while the camera system (55) is scanning the printed area of the sheet or web material and acquiring a complete image of the printed area.

47 Claims, 7 Drawing Sheets

(51) Int. Cl.
*B41F 9/06* (2006.01)
*B41F 9/02* (2006.01)
*B41F 21/00* (2006.01)
*B41F 21/08* (2006.01)
*B41F 21/10* (2006.01)
*B41F 22/00* (2006.01)

(52) U.S. Cl.
CPC .............. *B41F 21/00* (2013.01); *B41F 21/08* (2013.01); *B41F 21/10* (2013.01); *B41F 22/00* (2013.01); *H04N 7/18* (2013.01)

(56) References Cited

U.S. PATENT DOCUMENTS

| | | | |
|---|---|---|---|
| 5,317,390 A | 5/1994 | Bolza-Schunemann et al. | |
| 5,329,852 A | 7/1994 | Bolza-Schunemann et al. | |
| 5,384,859 A | 1/1995 | Bolza-Schunemann et al. | |
| RE35,495 E | 4/1997 | Bolza-Schunemann et al. | |
| 5,899,145 A | 5/1999 | Schaede | |
| 6,111,261 A | 8/2000 | Bolza-Schunemann et al. | |
| 6,176,482 B1 | 1/2001 | Reinhard et al. | |
| 6,746,014 B2 | 6/2004 | Endo et al. | |
| 6,772,689 B2 | 8/2004 | Endo et al. | |
| 7,011,020 B2 | 3/2006 | Dunninger et al. | |
| 8,231,125 B2 | 7/2012 | Hendle et al. | |
| 2001/0027730 A1* | 10/2001 | Kamoda | B41F 33/0036 101/190 |
| 2002/0035939 A1* | 3/2002 | Endo | B41F 33/0036 101/480 |
| 2002/0108516 A1* | 8/2002 | Endo | B41F 21/00 101/232 |
| 2004/0237816 A1 | 12/2004 | Dunninger et al. | |
| 2005/0127595 A1 | 6/2005 | Hendle et al. | |
| 2006/0008137 A1* | 1/2006 | Nagahdaripour | G06K 9/0063 382/154 |
| 2007/0102478 A1* | 5/2007 | Prince | B23K 3/0638 228/39 |
| 2007/0175912 A1 | 8/2007 | Uehara et al. | |
| 2007/0181016 A1 | 8/2007 | Schaede | |
| 2007/0222206 A1* | 9/2007 | Schaede | B42D 15/00 283/85 |
| 2008/0164430 A1* | 7/2008 | Diederichs | G01N 21/8806 250/559.08 |
| 2008/0295724 A1* | 12/2008 | Lohweg | B41F 33/0009 101/484 |
| 2009/0007807 A1 | 1/2009 | Schaede et al. | |
| 2009/0025594 A1 | 1/2009 | Schaede et al. | |
| 2010/0237560 A1* | 9/2010 | Kamoda | B41F 33/0036 271/264 |

FOREIGN PATENT DOCUMENTS

| | | | |
|---|---|---|---|
| EP | 0 323 537 | 7/1989 | |
| EP | 0820864 A1 * | 1/1998 | .............. B41F 21/08 |
| EP | 1 142 712 A1 | 10/2001 | |
| EP | 1 958 772 A2 | 8/2008 | |
| EP | 2 230 202 A2 | 9/2010 | |
| WO | WO 03/070465 A1 | 8/2003 | |
| WO | WO 2007/060615 A1 | 5/2007 | |
| WO | WO 2009/156926 A2 | 12/2009 | |

\* cited by examiner

INSPECTION SYSTEM FOR IN-LINE INSPECTION OF PRINTED MATERIAL PRODUCED ON AN INTAGLIO PRINTING PRESS

This application is the U.S. national phase of International Application No. PCT/IB2011/052791 filed 24 Jun. 2011 which designated the U.S. and claims priority to EP 10167431.5 filed 25 Jun. 2010, the entire contents of each of which are hereby incorporated by reference.

TECHNICAL FIELD

The present invention generally relates to the field of print quality inspection, and more particularly to in-line inspection of printed material in intaglio printing presses.

BACKGROUND OF THE INVENTION

During manufacturing of printed products, measures are typically taken to ensure a certain level of printing quality. This is particularly true in the field of security printing where the quality standards that must be reached by the end-products, i.e. banknotes, security documents and the like, are very high. Quality inspection of printed products conventionally involves optical inspection of the printed product using suitable camera systems for acquiring images of the printed material. Such optical inspection can be performed as an off-line process, i.e. after the printed products have been processed in the printing press, or, more and more frequently, as an in-line process, i.e. directly on the printing press where the printing operation is carried out.

Inspection methodologies for inspecting printed products, especially security documents, are for instance disclosed in U.S. patent publication Nos. U.S. Pat. Nos. 5,384,859 and 5,317,390.

Various types of in-line inspection systems are known in the art including systems which make use of matrix-type cameras, i.e. cameras comprising array sensors that are designed to take snapshots of the entire surface of the printed material to be inspected, or line-scan cameras, i.e. cameras comprising linear sensors that are designed to scan the entire surface of the printed material to be inspected while the printed material is being moved relative to the camera.

FIGS. 1 and 2 show a prior art sheet-fed intaglio printing press for printing sheets of securities, especially banknotes, comprising an in-line inspection system for inspecting the quality of the sheets being printed on the intaglio printing press.

Reference numeral 01 designates a feeding station for feeding successive sheets to a downstream-located printing group 02 of the intaglio printing press where the sheets are printed one after the other.

As is common in the art of intaglio printing, the printing group 02 comprises an impression cylinder 10 which cooperates with an intaglio printing cylinder 11 carrying engraved intaglio printing mediums on its circumference. More precisely, in this particular example, the intaglio printing cylinder 11 consists of a three-segment plate cylinder carrying three intaglio printing plates on its circumference, which intaglio printing plates are mounted on the cylinder 11 by suitable plate clamping systems (not shown) disposed in corresponding cylinder pits 11a (see FIG. 2). In this particular example, the impression cylinder 10 exhibits the same diameter as the intaglio printing cylinder 11 and carries three impression blankets on its circumference, which blankets are secured on the impression cylinder 10 by corresponding holding systems (not shown) located in cylinder pits 10a of the impression cylinder 10 (see again FIG. 2).

The intaglio printing cylinder 11 is inked by a suitable inking system comprising, in this example, an indirect inking system and a direct inking system. The indirect inking system includes an ink-collecting cylinder (or "Orlof cylinder") 12 contacting the intaglio printing cylinder 11 and three colour-selector cylinders 13 and associated inking units (not referenced) for applying multicolour ink patterns onto the ink-collecting cylinder 12. The direct inking system includes a fourth colour-selector cylinder 14 which is in direct contact with the intaglio printing cylinder 11 and an associated inking unit (not referenced) for applying an additional ink pattern onto the circumference of the intaglio printing cylinder.

In this example, all four inking units which supply ink to the colour-selector-cylinders 13, 14 are disposed in a mobile inking carriage 20 that can be retracted away from the printing group 02 to a maintenance position 20* (as shown in dashed lines in FIGS. 1 and 2).

Prior to printing, the inked intaglio printing mediums are wiped by a suitable wiping system comprising, as is typical in the art, a wiping roller 15 contacting the circumference of the intaglio printing cylinder 11. Excess inks which have been applied outside of the engravings of the intaglio printing mediums are removed under the action of the wiping roller 15 which also forces and pushes the inks into the engravings to achieve proper printing quality.

This particular intaglio printing configuration is purely illustrative and other configurations are known in the art, for instance from US patent publications Nos. U.S. Pat. Nos. 4,516,496, 5,062,359, 5,899,145, 7,011,020 B2 (US 2004/0237816 A1) and US 2007/0181016 A1, all in the name of the present Applicant, the contents thereof being incorporated herein by reference.

Sheets are fed in succession to the impression cylinder 10 by the feeding station 01, which impression cylinder 10 rotates in the clockwise direction in the illustrations and transports each sheet in succession past the printing nip formed between the impression cylinder 10 and the intaglio printing cylinder 11. Once printed, the sheets are taken away from the impression cylinder 10 by a suitable sheet conveyor system 03 for delivery to a sheet delivery station 04 comprising multiple delivery piles. The sheet conveyor system 03 consists, in this particular example, of a chain gripper system typically comprising two endless chains supporting a plurality of space-apart gripper bars (not shown) for holding the printed sheets by a leading edge thereof, which endless chains are driven along a delivery path (which runs in the counter-clockwise direction in the illustrations) between two pairs of chain wheels 31, 32.

FIGS. 1 and 2 further show that an in-line inspection system 05 and associated sheet-guiding member 06 are disposed along the path of the conveyor system 03, as well as a drying and/or curing unit 07.

The in-line inspection system 05 of FIGS. 1 and 2 and associated sheet-guiding member 06 are designed according to the disclosure of US patent publication No. US 2005/0127595 A1 (corresponding to International publication No. WO 03/070465 A1) which is incorporated herein by reference in its entirety. Other known examples are disclosed in U.S. patent publication Nos. U.S. Pat. No. 5,329,852, US Re. 35,495, U.S. Pat. Nos. 6,111,261, 6,176,482 B1.

A particularity of the inspection system 05 and sheet-guiding member 06 resides in the fact that the inspection system 05 comprises a matrix-type camera for taking snapshots of the freshly printed surface of the sheets (which freshly printed surface is oriented downwards in this example), while the backside of the sheets is being held against a curved suction surface of the sheet-guiding member. Examples of images taken by such an inspection system are for instance disclosed in FIGS. 4 and 4A to 4C of International publication No. WO 2007/060615 A1.

Other solutions for carrying out in-line inspection of printed sheets on intaglio printing presses are disclosed in U.S. patent publication Nos.US Pat. No. 6,746,014 B2 (US 2002/0108516 A1), U.S. Pat. No. 6,772,689 B2 (US 2002/0035939 A1), and US 2007/0175912 A1. Like the aforementioned disclosures, these other solutions are also based on the use of a matrix-type camera for acquiring images of the printed sheets to be inspected.

The use of line-scan cameras for performing in-line inspection of printed material on printing presses is also known as such in the art (see for instance US patent publications Nos. US 2009/0007807 A1 and US 2009/0025594 A1). Such line-scan cameras are in particular advantageous in that they are typically available with better performance and higher resolutions as compared to matrix-type cameras. Line-scan cameras are also advantageous in that they allow to take images that are substantially free of any optical aberrations or deformations. It is furthermore typically easier to ensure illumination consistency over the entire inspected surface using line-scan cameras as one only has to ensure an adequate illumination of the linear portion of the printed material being inspected, rather than of the entire sheet.

The use of line-scan cameras for performing in-line inspection of printed material on intaglio printing presses has however and so far not been put into practice due to constraints that are inherent to the intaglio printing process and to the behaviour of intaglio printing presses.

Indeed, intaglio printing is in particular characterized by very high printing pressures applied between the impression cylinder 10 and the intaglio printing cylinder 11. When the cylinder pits 10a, 11a of these cylinders 10, 11 meet, characterizing shocks are generated which produce vibrations that propagate to the entire printing press. It has therefore been typically considered that line-scan cameras would not be suitable to perform in-line inspection on intaglio printing presses as the vibrations and shocks resulting from the operation of the printing press would interfere with the image acquisition process of line-scan cameras and create optical aberrations and errors in the images taken by such systems.

In practice, matrix-type cameras have therefore been believed to be the only type of cameras suitable for performing in-line inspection on intaglio printing presses.

European patent publication No. EP 0 323 537 A1 discloses an intaglio printing press equipped with a device for detecting a defective print based on the inspection of the inked surface of the intaglio printing medium prior to printing. This device comprises a line-scan type CCD camera disposed so that its lens faces the surface of the intaglio printing cylinder at a position located downstream of the wiping roller with respect to a rotational direction of the intaglio printing cylinder in order to acquire an image of the inked surface of the intaglio printing mediums prior to printing. Besides the fact that the device is not as such inspecting the printed result and cannot therefore detect print defects that may occur as a result of the printing operation, this solution is also affected by the shocks and vibrations created by the cooperating impression cylinder and intaglio printing cylinder which will propagate to the line-scan camera and interfere with the image acquisition process.

European patent publication No. EP 2 230 202 A2, which was published only after the relevant priority date of the instant application discloses a quality inspection apparatus for an intaglio printing press which makes use of multiple line-scan cameras for acquiring an image of the printed sheets along the path of the printed sheets which are transported to the delivery station by means of a sheet conveyor system of the type comprising endless chains driving spaced-apart gripper bars. This publication is totally silent about the issues pertaining to shocks and vibrations that propagate throughout the intaglio printing press during the printing operation and that affect proper operation of the line-scan cameras. In view of the fact that the solutions disclosed in European patent publication No. EP 2 230 202 A2 make use of three line-scan cameras directed at different locations of the printed sheets, it is inevitable that the shocks and vibrations propagating through the intaglio printing press will interfere with the image acquisition process of the line-scan cameras.

SUMMARY OF THE INVENTION

A general aim of the invention is therefore to provide an improved inspection system for performing in-line inspection of printed material on an intaglio printing press.

A further aim of the invention is to provide such an inspection system which may adequately make use of line-scan type cameras for the image acquisition process.

Yet another aim of the invention is to provide such an inspection system which guarantees a proper image acquisition process and avoids such image acquisition process to be affected by shocks and vibrations propagating through the intaglio printing press during the printing operation.

These aims are achieved thanks to the subject-matter defined in the appended claims.

Further advantageous embodiments of the invention form the subject-matter of the dependent claims and are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

Embodiments of the invention will be described in the context of a sheet-fed intaglio printing press for processing sheet material. It is however to be understood that the invention is equally applicable to the processing of web material where the printed material consists of successive portions of a continuous web, rather than individual sheets.

The actual configuration of the intaglio printing press insofar as it relates to the printing group thereof and the inking system has no direct impact on the configuration of the inspection system per se and will not therefore be discussed hereinafter. Such configuration could be similar to the one illustrated in reference to FIGS. 1 and 2 or be any other suitable configuration.

Figure 3:
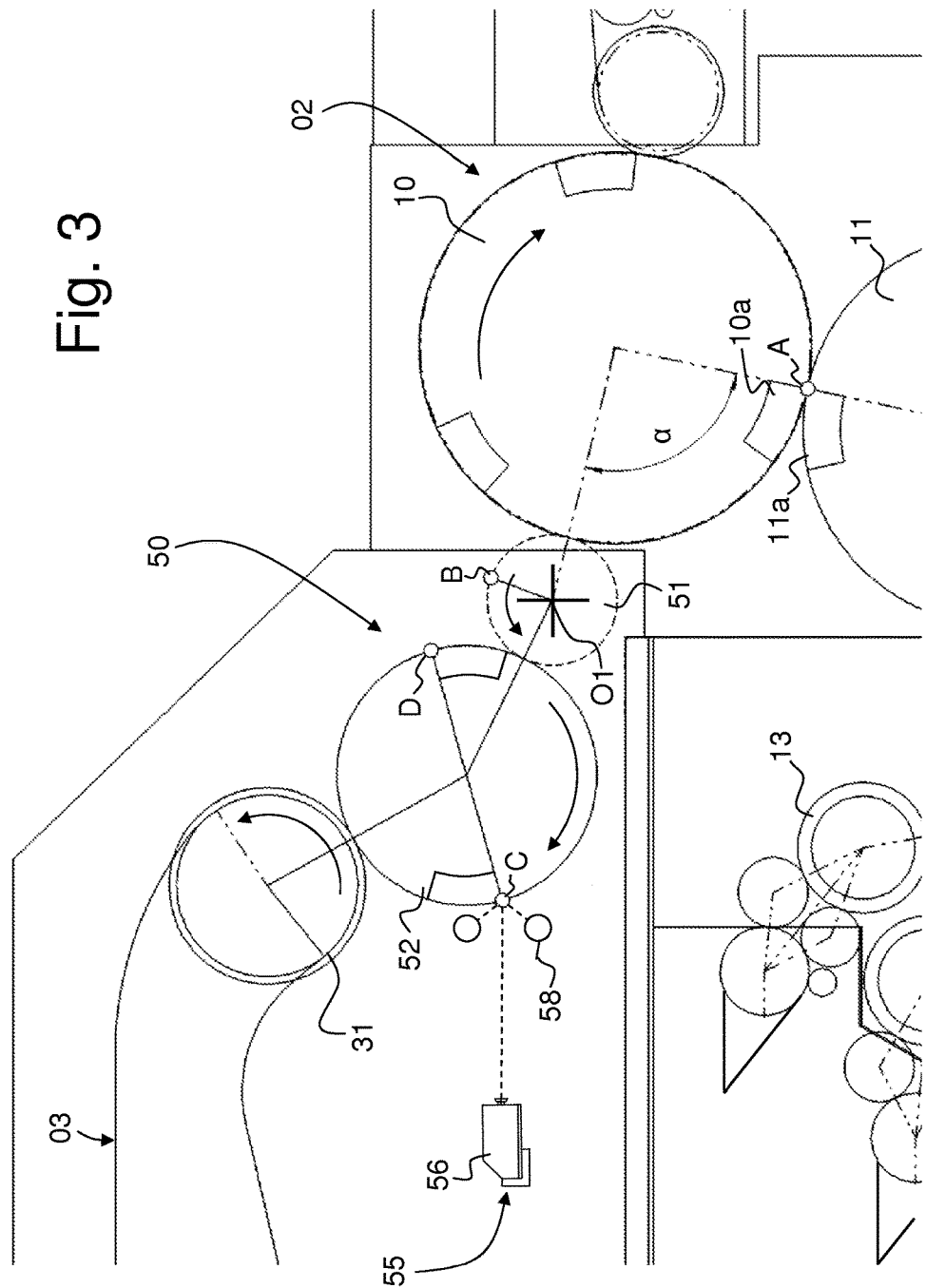
FIG. 3 is a schematic partial side view of an intaglio printing press equipped with an in-line inspection system according to a preferred embodiment of the invention.

FIG. 3 only shows a partial side view of an intaglio printing press where the impression cylinder 10 is visible, as well as an upper portion of the intaglio printing cylinder 11 and of the inking system (two colour-selector cylinders 13 and associated inking units being partially visible in FIG. 3).

FIG. 3 further shows an inspection system 50 for in-line inspection of the sheets being processed on the intaglio printing press according to one embodiment of the invention, which inspection system 50 comprises an optical quality control apparatus for carrying out inspection of a printed area on a printed side of the sheets. This optical quality control apparatus is typically coupled to an image processing unit (not shown) for processing the images acquired by the optical quality control apparatus. Such image processing system will not be described hereinafter as the invention focuses on the particular system for acquiring the images necessary for inspection, rather than on the processing of such images. Processing of the acquired images can be carried out in any suitable manner, as for instance disclosed in US patent publications Nos. U.S. Pat. Nos. 5,384,859 and 5,317,390, the purpose of such processing being to adequately detect and identify possible printing errors or like defects on the printed sheets.

According to the present invention, the optical quality control apparatus includes a camera system, designated generally by reference numeral 55 in FIG. 3, with one or more camera units each comprising at least one line-scan camera 56 for scanning and acquiring an image of the printed area while the sheet is being transported in the intaglio printing press past the camera system 55.

In the preferred example of FIG. 3, the camera system 55 comprises a single camera unit which is disposed transversely to the path of the sheets for scanning an entire width of the printed area of the sheets. Such camera unit may include one or more line-scan cameras 56 aligned transversely to the path of the sheets. One line-scan camera 56 could be used as long as it can see the whole width of the printed area to be inspected. Depending on practical constraints, it may be necessary or useful to provide two or more cameras 56 for scanning the entire width of the printed area, each camera scanning a corresponding section of the width of the printed area.

Figure 6:
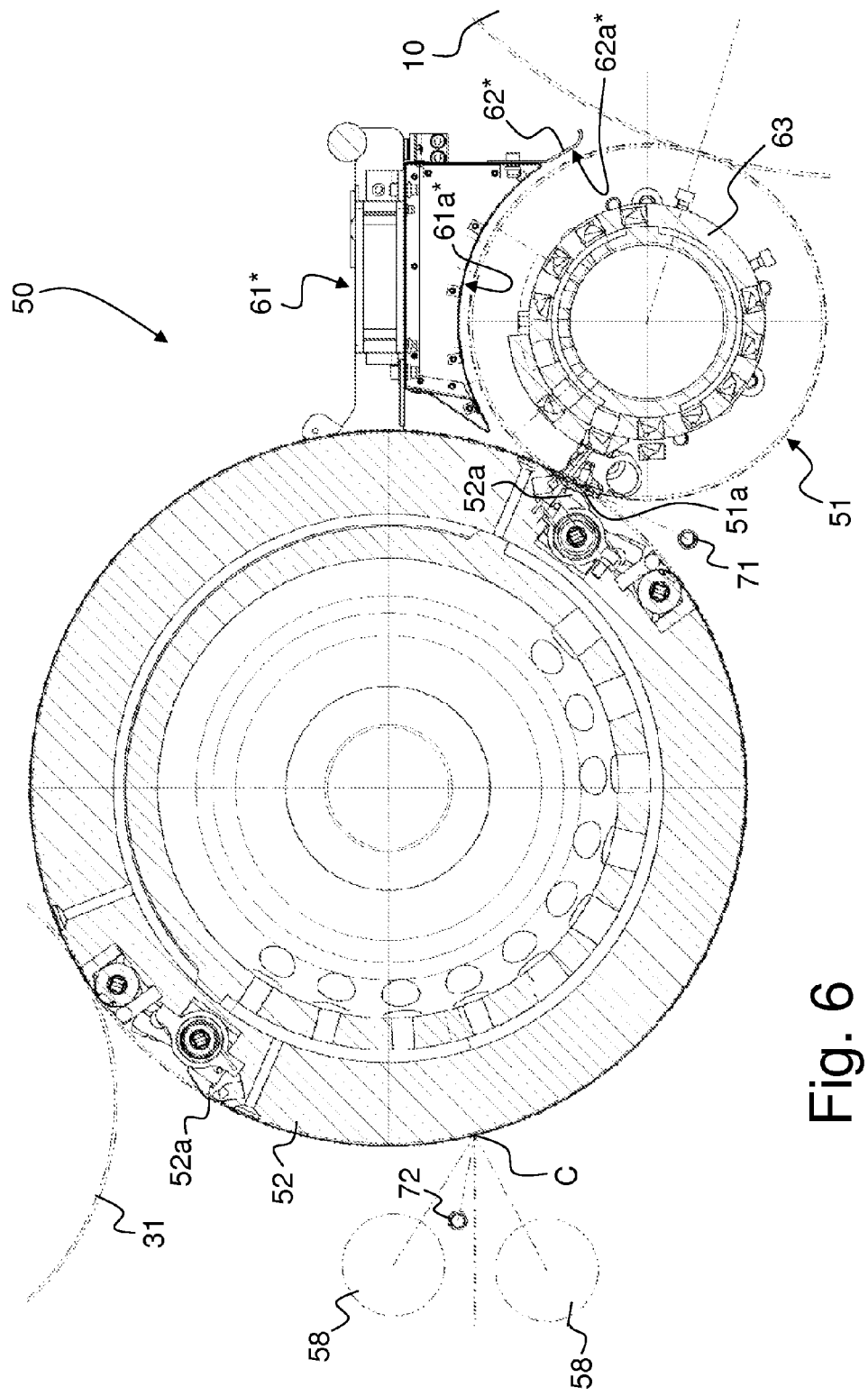
FIG. 6 is a schematic partial side view of a variant of the inspection system schematically illustrated in FIG. 4.

As shown in FIG. 3, an illumination unit 58 is provided to suitably illuminate the portion of the printed area which is inspected by means of the camera system 55. In this example, two lighting sources are provided on each side of the optical path of the camera system 55 in order to illuminate the desired portion of the printed areas along two different angles. As a further refinement, an adjustable blowing device, such as a blowing pipe, (not shown in FIG. 3) may be provided at the inspection location (location C in FIG. 3) in order to blow air against the portion of the printed sheet being inspected. Such a blowing device is schematically illustrated in FIG. 6 and designated by reference numeral 72.

As this will be appreciated hereinafter, the location of the one or more line-scan cameras 56 in the intaglio printing press along the delivery path of the sheets (i.e. the path of the sheets running from the printing group to the delivery station) is selected in such a way that cyclical vibrations that spread periodically throughout the intaglio printing press during operation thereof (i.e. as a result of the passage of the cylinders pits 10a, 11a of the impression cylinder 10 and intaglio printing cylinder 11) do not occur while the camera system 55 is scanning the printed area of the sheet and acquiring a complete image of the printed area. In this way, the cyclical vibrations of the intaglio printing press, which cannot be avoided, do not in any way interfere with the image acquisition process of the camera system.

In the preferred example of FIG. 3 where only a single camera unit is provided, the location of the camera unit is selected so that a distance along the delivery path of the sheets (hereinafter referred to as distance A-C) between the printing location A where printing of the sheets occurs (namely the location corresponding to the printing nip formed between the impression cylinder 10 and the intaglio printing cylinder 11) and the inspection location C where the camera system 55 acquires an image of the printed area of the sheet is an integer multiple of the distance separating two successive printed sheets, or sheet periodicity (i.e. the distance between the leading edge of a sheet to the leading edge of the immediately following sheet). In the particular example of FIG. 3, distance A-C is equal to twice the distance separating two successive printed sheets. The expression "distance" designates in this example the length of the path travelled by the sheets between two points along the path of the sheets, which path follows successive arcs of circles in the illustration of FIG. 3.

More precisely, in the embodiment of FIG. 3, an intermediate transfer unit 51 is provided for guiding (and in this case transporting) the sheets away from the impression cylinder 10 to the circumference of a downstream located inspection cylinder or drum 52, which inspection cylinder or drum guides (and likewise transports in this example) the printed sheets in succession in front of and past the camera unit.

The intermediate transfer unit 51 is preferably designed to guide the sheets along a curved trajectory forming an arc of a circle (see also FIG. 4) and is advantageously designed in this particular example as a rotating gripper system comprising at least one gripper bar (not shown) for holding a leading edge of the sheet and transporting the sheet along the curved trajectory (only one such gripper bar is provided in the particular example). The gripper bar is not illustrated in detail in the drawings of FIGS. 3 to 5, but its general configuration and design are similar to any conventional gripper bar. A possible implementation of the rotating gripper system acting as intermediate transfer unit 51 is schematically illustrated in the embodiment of FIG. 6 where reference numeral 51a designates the corresponding gripper bar of unit 51. In the context of the present embodiment, it suffices to understand that the rotating gripper system 51 is designed to take each successive sheet away from the impression cylinder 10 and transfer it to the circumference of the downstream located inspection cylinder or drum 52. In FIG. 3, reference B designates the gripper location where the leading edge of a sheet is being held by the gripper bar of the rotating gripper system 51.

Any other suitable system for guiding and transferring the sheets (or as the case may be for guiding a web) to the inspection cylinder or drum 52 could be used. It is however advantageous and preferred for the intermediate transfer unit 51 to be designed in such a way as to avoid any contact with the printed side of the sheets (or web) which is freshly printed on the intaglio printing press. Indeed, in the example of FIG. 3, the freshly printed side of the sheets is oriented downwards and any contact with this printed side should be avoided as much as possible. Cylinder or drum units with ink-repellent coatings could theoretically be envisaged as the intermediate transfer unit 51, but great care should be taken in this case not to affect the printing quality of the printed material.

In the context of the embodiment of FIG. 3 (and possible variations thereof), a radius of the curved trajectory formed by the intermediate transfer unit 51 (or more precisely the trajectory formed by the gripper portion of this unit where the leading edge of the sheet is being held) and a radius of the inspection cylinder or drum 52 are each a fraction of the radius of the impression cylinder 10 of the intaglio printing press. In this particular example, the impression cylinder 10 is a three-segment (n=3) cylinder and the radiuses of the curved trajectory of intermediate transfer unit 51 and of the inspection cylinder or drum 52 are respectively 1/n=⅓ and 2/n=⅔ of the radius of the impression cylinder. In other words, the inspection cylinder or drum 52 is a two-segment cylinder or drum in this example and reference D designate a second gripper location of the inspection cylinder or drum 52 (the first gripper location coinciding in the illustration of FIG. 3 with the inspection location C). Other configurations are however possible within the scope of the present invention. FIG. 6 shows corresponding gripper bars of the inspection cylinder or drum 52 which are designated by reference numeral 52a. In the illustration of FIG. 6, it will be appreciated that the rotating gripper system acting as intermediate transfer unit 51 and the inspection cylinder or drum 52 are illustrated in positions corresponding to a transfer of a sheet from the intermediate transfer unit 51 to the downstream located inspection cylinder or drum 52. In other words, in FIG. 6, the gripper bar 51a of the rotating gripper system is positioned in front of one of the gripper bars 52a of the inspection cylinder or drum 52

Figure 4:
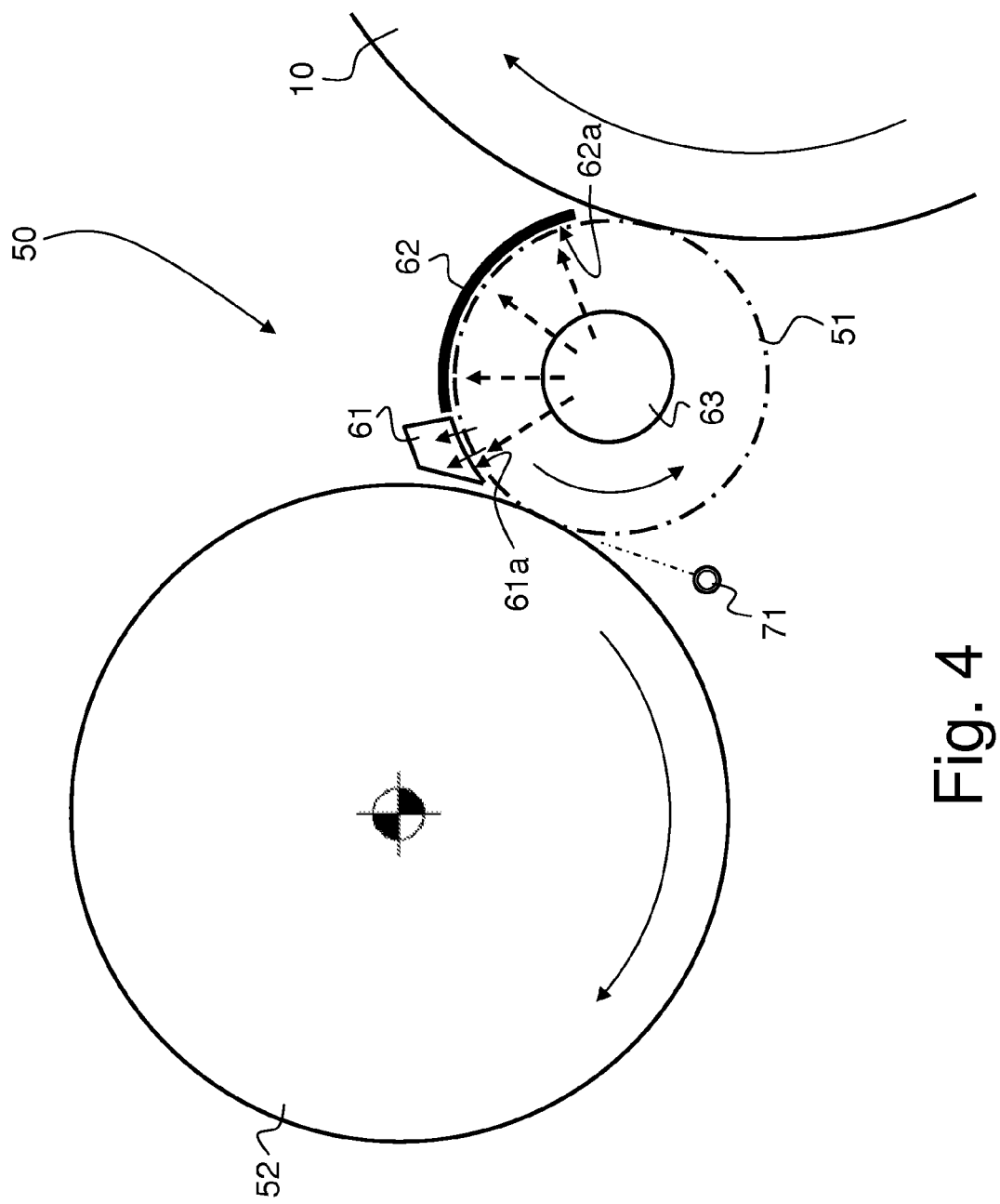
FIG. 4 is a schematic partial side view of a preferred embodiment of the inspection system of FIG. 3.

Turning now to FIG. 4, a preferred embodiment of the inspection system of FIG. 3 will be discussed. Reference numerals 10, 50, 51 and 52 designate the same elements as discussed in reference to FIG. 3 and will not be discussed again.

FIG. 4 further shows a suction unit 61 which is located next to the path of the sheet and upstream of the inspection cylinder or drum 52. Reference numeral 61a in FIG. 4 designates an aspiration surface of the suction unit 61. This suction unit 61 is designed to draw a backside of the sheet (i.e. the side opposite the printed side) while the sheet is being guided and transferred to the circumference of the inspection cylinder or drum 52. In this way, a proper and adequate transfer of the sheet from the unit 51 to the inspection cylinder or drum 52 is ensured, the suction unit 61 assisting a transfer of the sheet tangentially to the circumference of the inspection cylinder or drum 52. This is advantageous in that the sheet can be transferred on the inspection cylinder or drum so that it is properly supported on the circumference of the inspection cylinder during the image acquisition process, avoiding as much as possible the formation of waves or "bubbles" which could affect the quality of the images acquired by the inspection system.

In this context, an adjustable blowing device 71, such as a blowing pipe, may be provided downstream of the location where the sheet is transferred from the intermediate transfer unit 51 to the inspection cylinder or drum 52 in order to blow air towards the printed side of the sheet as schematically illustrated in FIG. 4 (and also shown in FIG. 6).

As shown in FIG. 4, the inspection system may comprise a guide member 62 with a guide surface 62a (which guide member can take the shape in this example of a curved plate or of curved members following the curvature of the trajectory of the rotating gripper system) located next to the path of the sheet for supporting the backside thereof while the sheet is being transferred by the unit 51 from the impression cylinder 10 to the inspection cylinder or drum 52.

An additional blowing unit 63 may further be provided to blow air (from the inside of the unit 51 in FIG. 4) against the printed side of the sheet, thereby pushing the backside thereof against the guide member 62 and against the suction unit 61. In this way, one avoids as much as possible that the printed side of the sheet may come into contact with any element of the printing press, which could cause printing defects or damage the sheet.

Advantageously, the blowing unit 63 forms an integral part of the intermediate transfer unit 51 (see e.g. FIG. 6). This blowing unit 63 may in particular be designed in a way similar to a transfer drum having a smaller radius than the radius of the curved trajectory followed by the gripper portion of the intermediate transfer unit 51 (so as not to come into contact with the printed side of the sheet), with blast nozzles being provided on an outer circumference of the drum to blow air against the printed side of the sheet.

Preferably, the blowing unit 63 is designed to blow air over an angular sector which extends substantially from the location where the printed material leaves the circumference of the impression cylinder 10 and the location where the printed material is conveyed to the inspection cylinder or drum 52. In this way, the blowing of air eliminates any risk that the printed side of the sheet may come into contact with any element of the printing press during transfer by the intermediate transfer unit 51.

According to another embodiment of the invention illustrated in FIG. 6, the suction unit 61\* may advantageously be designed to extend along substantially the entire path between the location where the printed material leaves the circumference of the impression cylinder 10 and the location where the printed material is conveyed to the inspection cylinder or drum 52. As compared to the embodiment of FIG. 4, the suction unit 61\* exhibits in this case a larger aspiration surface 61a\* extending almost along the entire path of the sheets between the impression cylinder 10 and the inspection cylinder or drum 52. In this other example, a guide member 62\* having a guide surface 62a\* is also provided upstream of the suction unit 61\* in a way similar to what is illustrated in FIG. 4. In this particular example, the guide member 62\* is advantageously secured to the suction unit 61\*.

Figure 7:
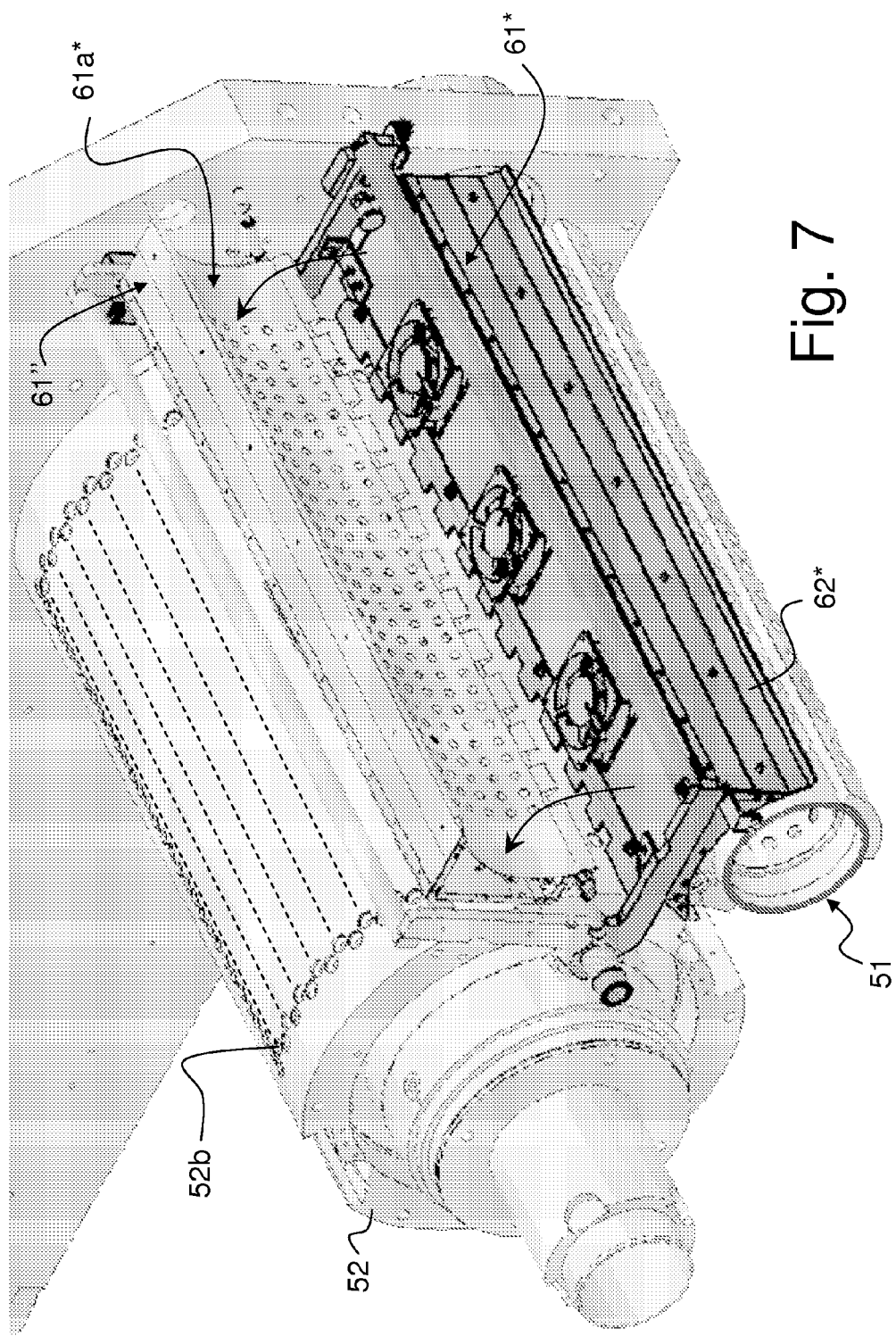
FIG. 7 is a partial perspective view of the inspection system of FIG. 6 showing in particular a suction unit that is moveable between a working position, next to the path of the printed material, and a maintenance position, retracted away from the working position.

FIG. 7 is a partial perspective view of the inspection system of FIG. 6 showing the suction unit 61\* in its working position, next to the path of the printed material. Advantageously, the suction unit 61\* is designed so as to be moveable between the working position and a maintenance position, retracted away from the working position, which maintenance position is indicated by reference numeral 61" in FIG. 7. Movement from the working position to the maintenance position is carried out in this example by pivoting the suction unit 61* away from the intermediate transfer unit 51, as indicated by the arrows in FIG. 7.

FIG. 7 further shows suction holes provided in the aspiration surface 61a* of the suction unit 61*, as well as suction holes 52b provided on the circumference of the inspection cylinder or drum 52 (only part of the suction holes 52b being shown in FIG. 7).

Figure 1:
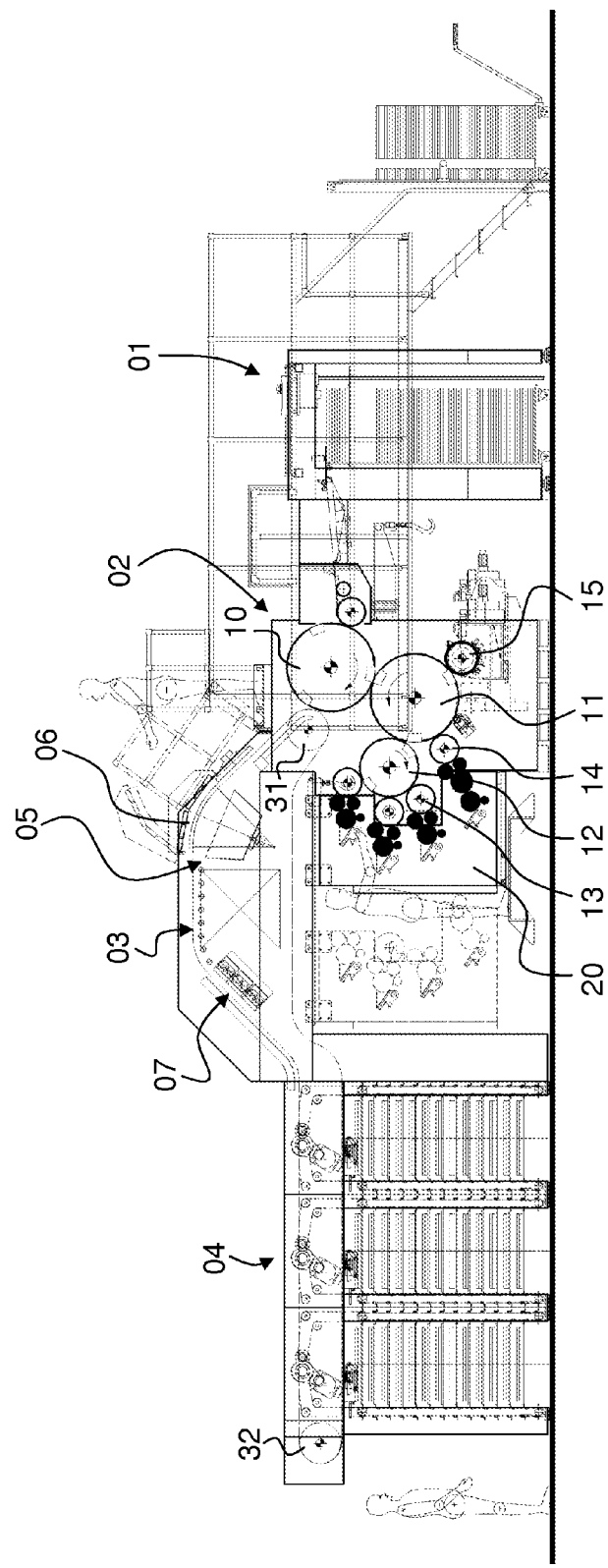
FIG. 1 is a schematic side view of a sheet-fed intaglio printing press equipped with an in-line inspection system for inspecting the quality of sheets being printed on the intaglio printing press as is known in the art.
Figure 2:
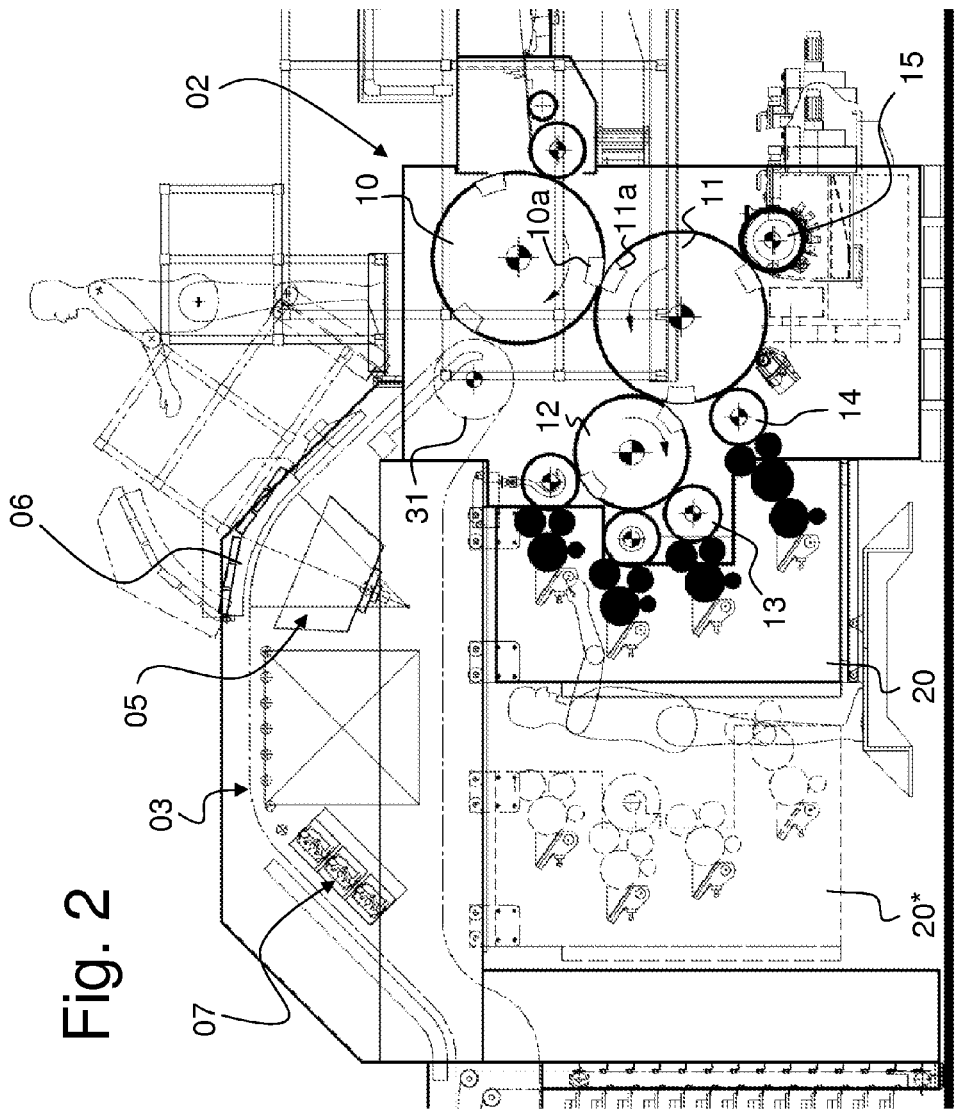
FIG. 2 is an enlarged partial side view of the intaglio printing press of FIG. 1 and of the in-line inspection system.
Figure 5:
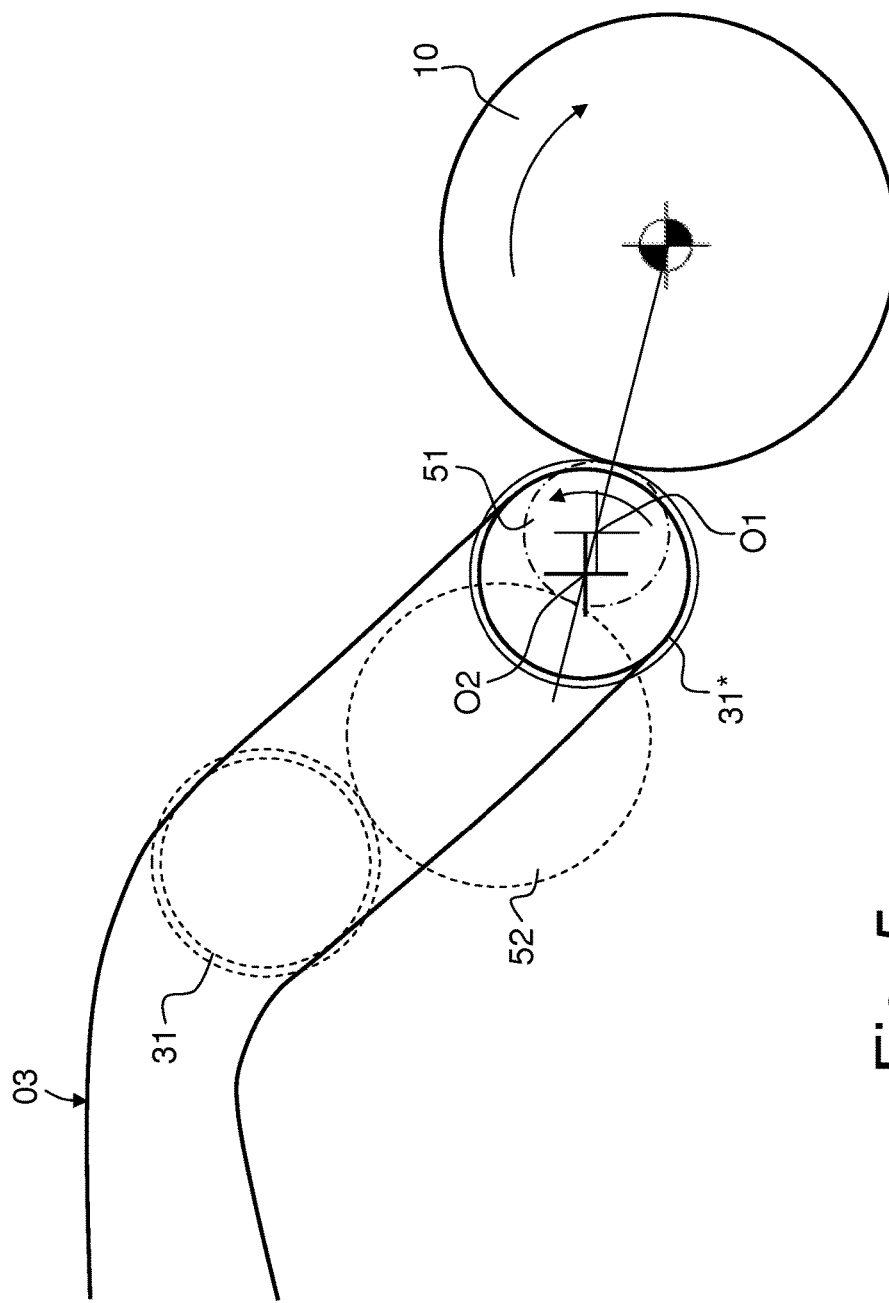
FIG. 5 is a schematic partial side view of the intaglio printing press of FIG. 3 showing a configuration without the inspection system.

FIG. 5 is a schematic partial side view of the intaglio printing press of FIG. 3 showing a configuration without the inspection system 50. As shown in FIGS. 3 and 5, when the inspection system 50 comprising the unit 51 and the inspection cylinder or drum 52 is installed in the intaglio printing press, the upstream chain wheels 31 of the sheet conveyor system 03 are disposed so as to take the inspected sheets away from the inspection cylinder or drum 52 and transfer the sheets to the sheet delivery station 04 (in the same way as illustrated in FIG. 1). In FIG. 5, the unit 51, the inspection cylinder or drum 52, and the upstream chain wheels 31 of the sheet conveyor system 03 are shown in dashed lines. When the inspection unit 50 is not required, elements 51 and 52 are omitted (as well as the associated components) and the upstream chain wheels, designated by reference numeral 31* in this case, are moved to cooperate directly with the impression cylinder 10 (in the same way as illustrated in FIGS. 1 and 2).

In other words, the inspection system 50 is advantageously designed as a removable system which can be dismantled from the intaglio printing press and the upstream chain wheels of the sheet conveyor system 03 can be positioned next to the impression cylinder 10 of the intaglio printing press to allow direct transfer of the sheets from the impression cylinder 10 to the sheet conveyor system 03, as illustrated by FIG. 5.

Preferably, as schematically shown in FIG. 5, the intaglio printing press is designed in such a way that the axis of rotation O2 of the chain wheels 31* (when cooperating with the impression cylinder 10) lies on the same line intersecting the axis of rotation O1 of the unit 51 and the axis of rotation of the impression cylinder 10. A suitable bearing arrangement for supporting either the unit 51 or the chain wheels 31* could be provided in the side frames of the printing press to facilitate conversion of the intaglio printing press from one configuration, with inspection system, to another configuration, without inspection system. This could in particular be achieved by using an adjustable bearing arrangement designed to define two determined bearing positions, namely a first bearing position corresponding to the proper location for supporting a shaft of the intermediate transfer unit 51 and a second bearing position corresponding to the proper location for supporting a shaft of the chain wheels 31*.

Various modifications and/or improvements may be made to the above-described embodiments without departing from the scope of the invention as defined by the annexed claims.

For instance, while the invention was described in relation to the preferred embodiments of FIGS. 3 to 7, the camera system 55 could be located along the path of the sheet conveyor system 03 at a corresponding and suitably selected location while still ensuring that a distance along the delivery path between the printing location where printing of the sheets occurs and the inspection location where the camera system acquires an image of the printed area of the sheet is an integer multiple of the distance separating two successive printed samples of the sheets. In this context, it would be preferable to additionally provide at least one sheet-guiding member, preferably a rotating suction cylinder or roller, for supporting the backside of the sheet being transported by the sheet conveyor system 03 as for instance disclosed in International patent publication WO 2009/156926 A2 in the name of the present Applicant, the content of which is incorporated herein by reference in its entirety.

Yet another variant may consist in providing a camera system with two or more camera units distributed along the delivery path of the sheets or web, each camera unit being likewise disposed transversely to the path of the sheets or web for scanning an entire width of the printed area of the sheet or web material. In such a case, it could suffice to ensure that the two or more camera units each acquire a sectional image of a longitudinal section of the printed area of the sheets or web (for instance two complementary halves thereof), to combine these sectional images to build a complete image of the printed area, and to ensure that the locations of the two or more camera units along the delivery path are selected in such a way that the cyclical vibrations do not occur while each camera unit is scanning the corresponding longitudinal section of the printed area and acquiring the corresponding sectional image thereof. In other words, the preferred embodiment of the inspection system comprising the intermediate transfer unit 51 and inspection cylinder or drum 52 could equally be used with such a camera system.

In any case, as already mentioned, the invention is applicable equally to the inspection of sheet material or web material. It is also to be appreciated again that each camera unit (whether one such unit or a plurality are provided) could include one or more line-scan cameras aligned transversely to the path of the sheet or web material.

In the context of the present invention, the expression "printed area" should be understood as referring to the relevant area which is printed on the intaglio printing press. As the case may be, the inspection system is designed to inspect all of the printed area, and possibly (but not necessarily) margin portions of the sheet or web material. The expression "delivery path" should be understood as referring to the path of the sheet or web material extending from the printing nip between the impression cylinder and the intaglio printing cylinder and the location where the sheet or web material is being delivered.

LIST OF REFERENCES USED IN THE
FIGURES AND SPECIFICATION 01 sheet feeding station
02 printing group of intaglio printing press
03 sheet conveyor system (e.g. chain gripper system comprising a pair of endless chains supporting and driving space-apart gripper bars for holding a leading edge of the printed sheets
04 sheet delivery station with multiple delivery piles for delivery of the printed sheets
05 inspection system (prior art)
06 sheet-guiding (suction) unit (prior art)
07 drying and/or curing unit
10 impression cylinder of intaglio printing press (three-segment cylinder carrying three impression blankets in the illustrated example)
10a cylinder pits of impression cylinder 10
11 intaglio printing cylinder carrying intaglio printing mediums (three-segment plate cylinder carrying three intaglio printing plates in the illustrated example)
11a cylinder pits of intaglio printing cylinder 11
12 ink-collecting cylinder (or "Orlof cylinder")/indirect inking system 13 colour-selector cylinders (or "chablon cylinders") for applying ink patterns onto ink-collecting cylinder 12
14 additional colour-selector cylinder (or "chablon cylinder") for applying ink pattern onto intaglio printing cylinder 11/direct inking system
15 wiping roller of wiping system
20 mobile inking carriage supporting inking units of colour-selector cylinders 13 and 14
20* mobile inking carriage 20 in retracted (maintenance) position
31 chain wheels of sheet conveyor system 03 (upstream side)
31* chain wheels of sheet conveyor system 03 (upstream side) positioned for cooperation with impression cylinder 10 (without inspection system 50)
32 chain wheels of sheet conveyor system 03 (downstream side)
50 inspection system
51 rotating gripper system (intermediate transfer unit)
51a sheet gripper/gripper bar of rotating gripper system 51
52 inspection cylinder or drum (two-segment cylinder or drum)
52a sheet grippers/gripper bars of inspection cylinder or drum
55 camera system/unit
56 line-scan camera(s) disposed transversely to the path of the sheets
58 illumination unit
61 suction unit (FIG. 3)
61a aspiration surface of suction unit 61
61* suction unit (in working position—FIGS. 6 and 7)
61a* aspiration surface of suction unit 61*
61" suction unit 61* in maintenance position (FIG. 7)
62 guide member (FIG. 3)
62a guide surface of guide member 62
62* guide member (FIGS. 6 and 7)
62a* guide surface of guide member 62*
63 blowing unit
71 adjustable blowing device (e.g. blowing pipe)
72 adjustable blowing device (e.g. blowing pipe)
A printing location/printing nip between impression cylinder 10 and intaglio printing cylinder 11
B gripper location where leading edge of sheet is held by rotating gripper system 51
C inspection location on inspection cylinder or drum 52
D second gripper location on inspection cylinder or drum 52
O1 axis of rotation of the rotating gripper system 51
O2 axis of rotation of chain wheels 31*
α angle between printing location and location where the sheets are taken away from the impression cylinder 10 by rotating gripper system 51

The invention claimed is:

1. An intaglio printing press comprising an inspection system for in-line inspection of sheet or web material on the intaglio printing press,
wherein the inspection system comprises an optical quality control apparatus for carrying out inspection of a printed area on a printed side of the sheet or web material, the optical quality control apparatus including a camera system with one or more camera units each comprising at least one line-scan camera for scanning and acquiring an image of the printed area while the sheet or web material is being transported in the intaglio printing press past the camera system,
wherein a location of the at least one line-scan camera in the intaglio printing press along a delivery path of the sheet or web material is such that cyclical vibrations that spread periodically throughout the intaglio printing press during operation of the intaglio printing press do not occur while the camera system is scanning the printed area of the sheet or web material and acquiring a complete image of the printed area,
wherein the camera system comprises a single camera unit disposed transversely to the path of the sheet or web material for scanning an entire width of the printed area of the sheet or web material,
wherein a distance along the delivery path between a printing location where printing of the sheet or web material occurs and an inspection location where the camera system acquires an image of the printed area of the sheet or web material is an integer multiple of the distance separating two successive printed samples of the sheet or web material, which is the distance between a leading edge of a sheet or web material to a leading edge of an immediately following sheet or web material, and the distance includes a length of an impression cylinder pit,
wherein the intaglio printing press is designed for processing sheet material, and wherein the camera system is located along the path of a sheet conveyor system comprising a pair of endless chains driving spaced-apart gripper bars for holding a leading edge of the sheet material, and
wherein the intaglio printing press further comprises at least one sheet-guiding member for supporting a back-side of the sheet material opposite the printed side in the region of the inspection location.

2. The intaglio printing press as defined in claim 1, further comprising an intermediate transfer unit for guiding the sheet or web material away from an impression cylinder of the intaglio printing press to the circumference of a downstream located inspection cylinder or drum, which inspection cylinder or drum guides the sheet or web material in front of and past the camera system.

3. An intaglio printing press comprising an inspection system for in-line inspection of sheet or web material on the intaglio printing press,
wherein the inspection system comprises an optical quality control apparatus for carrying out inspection of a printed area on a printed side of the sheet or web material, the optical quality control apparatus including a camera system with one or more camera units each comprising at least one line-scan camera for scanning and acquiring an image of the printed area while the sheet or web material is being transported in the intaglio printing press past the camera system,
wherein the inspection system comprises an intermediate transfer unit for guiding the sheet or web material away from an impression cylinder of the intaglio printing press to the circumference of a downstream located inspection cylinder or drum, which inspection cylinder or drum guides the sheet or web material in front of and past the camera system, the intermediate transfer unit being interposed between the impression cylinder and the inspection cylinder or drum,
wherein the camera system comprises a single camera unit disposed transversely to the path of the sheet or web material for scanning an entire width of the printed area of the sheet or web material,
wherein a distance along the delivery path between a printing location where printing of the sheet or web material occurs on the impression cylinder and an inspection location where the camera system acquires an image of the printed area of the sheet or web material on the inspection cylinder or drum is an integer multiple of the distance separating two successive printed samples of the sheet or web material which includes a length of a cylinder pit of the impression cylinder, thereby ensuring that cyclical vibrations that spread periodically throughout the intaglio printing press during operation of the intaglio printing press do not occur while the camera system is scanning the printed area of the sheet or web material and acquiring a complete image of the printed area, and wherein the intermediate transfer unit guides the sheet or web material along a curved trajectory forming an arc of a circle, and wherein a radius of the curved trajectory and a radius of the inspection cylinder or drum are each a fraction of the radius of the impression cylinder of the intaglio printing press.

4. The intaglio printing press as defined in claim 2, wherein the intermediate transfer unit guides the sheet or web material along a curved trajectory forming an arc of a circle, and wherein a radius of the curved trajectory and a radius of the inspection cylinder or drum are each a fraction of the radius of the impression cylinder of the intaglio printing press.

5. The intaglio printing press as defined in claim 4, wherein the impression cylinder exhibits n segments and wherein the radiuses of the curved trajectory and of the inspection cylinder or drum are respectively 1/n and 2/n of the radius of the impression cylinder.

6. The intaglio printing press as defined in claim 2, wherein the intermediate transfer unit is arranged to avoid any contact with the printed side of the sheet or web material which is freshly printed on the intaglio printing press.

7. The intaglio printing press as defined in claim 6, designed for processing sheet material, wherein the intermediate transfer unit is designed as a rotating gripper system comprising at least one gripper bar for holding a leading edge of the sheet material and transporting the sheet material along a trajectory forming an arc of a circle.

8. The intaglio printing press as defined in claim 6, further comprising a suction unit located next to the path of the sheet or web material and upstream of the inspection cylinder or drum for drawing a backside of the sheet or web material opposite the printed side while the sheet or web material is being guided to the circumference of the inspection cylinder or drum.

9. The intaglio printing press as defined in claim 8, wherein the suction unit extends along substantially the entire path between a location where the sheet or web material leaves the circumference of the impression cylinder and a location where the sheet or web material is conveyed to the inspection cylinder or drum.

10. The intaglio printing press as defined in claim 8, further comprising a blowing unit for blowing air against the printed side of the sheet or web material and pushing the backside of the sheet or web material towards an aspiration surface of the suction unit.

11. The intaglio printing press as defined in claim 8, wherein the suction unit is moveable between a working position, next to the path of the sheet or web material, and a maintenance position, retracted away from the working position.

12. The intaglio printing press as defined in claim 6, further comprising a guide member located next to the path of the sheet or web material for supporting a backside of the sheet or web material opposite the printed side while the sheet or web material is being guided by the intermediate transfer unit from the impression cylinder to the inspection cylinder or drum.

13. The intaglio printing press as defined in claim 12, further comprising a blowing unit for blowing air against the printed side of the sheet or web material and pushing the backside of the sheet or web material against a guide surface of the guide member.

14. The intaglio printing press as defined in claim 10, wherein the blowing unit forms an integral part of the intermediate transfer unit.

15. The intaglio printing press as defined in claim 10, wherein the blowing unit is designed to blow air over an angular sector which extends substantially from a location where the sheet or web material leaves the circumference of the impression cylinder and a location where the sheet or web material is conveyed to the inspection cylinder or drum.

16. The intaglio printing press as defined in claim 2, further comprising a blowing device provided downstream of the location where the sheet or web material is transferred from the intermediate transfer unit to the inspection cylinder or drum in order to blow air towards the printed side of the sheet or web material.

17. The intaglio printing press as defined in claim 1, wherein the sheet-guiding member is a rotating suction cylinder or roller.

18. The intaglio printing press as defined in claim 1, wherein the camera system comprises two or more camera units distributed along the delivery path, each camera unit being disposed transversely to the path of the sheet or web material for scanning an entire width of the printed area of the sheet or web material, wherein the two or more camera units each acquire a sectional image of a longitudinal section of the printed area of the sheet or web material, wherein the sectional images of the two or more camera units are combined to build a complete image of the printed area, and wherein the locations of the two or more camera units along the delivery path are selected in such a way that the cyclical vibrations do not occur while each camera unit is scanning the corresponding longitudinal section of the printed area and acquiring the corresponding sectional image thereof.

19. The intaglio printing press as defined in claim 1, wherein each camera unit includes one or more line-scan cameras aligned transversely to the path of the sheet or web material.

20. The intaglio printing press as defined in claim 2, wherein the intaglio printing press is a sheet-fed intaglio printing press and further comprises a sheet conveyor system for conveying the sheet material to a sheet delivery station of the intaglio printing press, which sheet conveyor system comprises a pair of endless chains driving spaced-apart gripper bars for holding a leading edge of the sheet material, wherein chain wheels of the sheet conveyor system which are located at an upstream side of the sheet conveyor system are positioned to allow direct transfer of the sheet material from the inspection cylinder or drum to the sheet conveyor system.

21. The sheet-fed intaglio printing press as defined in claim 20, wherein the inspection system is designed as a removable system which can be dismantled from the intaglio printing press and wherein the chain wheels of the sheet conveyor system which are located at the upstream side of the sheet conveyor system can be positioned next to the impression cylinder of the intaglio printing press to allow direct transfer of the sheet material from the impression cylinder to the sheet conveyor system.

22. The sheet-fed intaglio printing press as defined in claim 21, wherein an axis of rotation of the chain wheels, when cooperating directly with the impression cylinder, lies on a same line intersecting an axis of rotation of the intermediate transfer unit and an axis of rotation of the impression cylinder.

23. The sheet-fed intaglio printing press as defined in claim 22, comprising a bearing arrangement for supporting either the intermediate transfer unit or the chain wheels and allow conversion of the intaglio printing press from one configuration, with inspection system, to another configuration, without inspection system, and vice versa.

24. The intaglio printing press as defined in claim 3, wherein the impression cylinder exhibits n segments and wherein the radiuses of the curved trajectory and of the inspection cylinder or drum are respectively 1/n and 2/n of the radius of the impression cylinder.

25. The intaglio printing press as defined in claim 13, wherein the blowing unit forms an integral part of the intermediate transfer unit.

26. The intaglio printing press as defined in claim 13, wherein the blowing unit is designed to blow air over an angular sector which extends substantially from a location where the sheet or web material leaves the circumference of the impression cylinder and a location where the sheet or web material is conveyed to the inspection cylinder or drum.

27. The intaglio printing press as defined in claim 3, wherein the intermediate transfer unit is arranged to avoid any contact with the printed side of the sheet or web material which is freshly printed on the intaglio printing press.

28. The intaglio printing press as defined in claim 27, designed for processing sheet material, wherein the intermediate transfer unit is designed as a rotating gripper system comprising at least one gripper bar for holding a leading edge of the sheet material and transporting the sheet material along a trajectory forming an arc of a circle.

29. The intaglio printing press as defined in claim 27, further comprising a suction unit located next to the path of the sheet or web material and upstream of the inspection cylinder or drum for drawing a backside of the sheet or web material opposite the printed side while the sheet or web material is being guided to the circumference of the inspection cylinder or drum.

30. The intaglio printing press as defined in claim 29, wherein the suction unit extends along substantially the entire path between a location where the sheet or web material leaves the circumference of the impression cylinder and a location where the sheet or web material is conveyed to the inspection cylinder or drum.

31. The intaglio printing press as defined in claim 29, further comprising a blowing unit for blowing air against the printed side of the sheet or web material and pushing the backside of the sheet or web material towards an aspiration surface of the suction unit.

32. The intaglio printing press as defined in claim 29, wherein the suction unit is moveable between a working position, next to the path of the sheet or web material, and a maintenance position, retracted away from the working position.

33. The intaglio printing press as defined in claim 27, further comprising a guide member located next to the path of the sheet or web material for supporting a backside of the sheet or web material opposite the printed side while the sheet or web material is being guided by the intermediate transfer unit from the impression cylinder to the inspection cylinder or drum.

34. The intaglio printing press as defined in claim 33, further comprising a blowing unit for blowing air against the printed side of the sheet or web material and pushing the backside of the sheet or web material against a guide surface of the guide member.

35. The intaglio printing press as defined in claim 31, wherein the blowing unit forms an integral part of the intermediate transfer unit.

36. The intaglio printing press as defined in claim 31, wherein the blowing unit is designed to blow air over an angular sector which extends substantially from a location where the sheet or web material leaves the circumference of the impression cylinder and a location where the sheet or web material is conveyed to the inspection cylinder or drum.

37. The intaglio printing press as defined in claim 34, wherein the blowing unit forms an integral part of the intermediate transfer unit.

38. The intaglio printing press as defined in claim 34, wherein the blowing unit is designed to blow air over an angular sector which extends substantially from a location where the sheet or web material leaves the circumference of the impression cylinder and a location where the sheet or web material is conveyed to the inspection cylinder or drum.

39. The intaglio printing press as defined in claim 16, wherein the blowing device is a blowing pipe.

40. The intaglio printing press as defined in claim 3, further comprising a blowing device provided downstream of the location where the sheet or web material is transferred from the intermediate transfer unit to the inspection cylinder or drum in order to blow air towards the printed side of the sheet or web material.

41. The intaglio printing press as defined in claim 40, wherein the blowing device is a blowing pipe.

42. The intaglio printing press as defined in claim 3, wherein the camera system comprises two or more camera units distributed along the delivery path, each camera unit being disposed transversely to the path of the sheet or web material for scanning an entire width of the printed area of the sheet or web material,
- wherein the two or more camera units each acquire a sectional image of a longitudinal section of the printed area of the sheet or web material,
- wherein the sectional images of the two or more camera units are combined to build a complete image of the printed area,
- and wherein the locations of the two or more camera units along the delivery path are selected in such a way that the cyclical vibrations do not occur while each camera unit is scanning the corresponding longitudinal section of the printed area and acquiring the corresponding sectional image thereof.

43. The intaglio printing press as defined in claim 3, wherein each camera unit includes one or more line-scan cameras aligned transversely to the path of the sheet or web material.

44. The intaglio printing press as defined in claim 3, wherein the intaglio printing press is a sheet-fed intaglio printing press and further comprises a sheet conveyor system for conveying the sheet material to a sheet delivery station of the intaglio printing press, which sheet conveyor system comprises a pair of endless chains driving spaced-apart gripper bars for holding a leading edge of the sheet material, wherein chain wheels of the sheet conveyor system which are located at an upstream side of the sheet conveyor system are positioned to allow direct transfer of the sheet material from the inspection cylinder or drum to the sheet conveyor system.

45. The sheet-fed intaglio printing press as defined in claim 44, wherein the inspection system is designed as a removable system which can be dismantled from the intaglio printing press and wherein the chain wheels of the sheet conveyor system which are located at the upstream side of the sheet conveyor system can be positioned next to the impression cylinder of the intaglio printing press to allow direct transfer of the sheet material from the impression cylinder to the sheet conveyor system.

46. The sheet-fed intaglio printing press as defined in claim 45, wherein an axis of rotation of the chain wheels, when cooperating directly with the impression cylinder, lies on a same line intersecting an axis of rotation of the intermediate transfer unit and an axis of rotation of the impression cylinder.

47. The sheet-fed intaglio printing press as defined in claim 46, comprising a bearing arrangement for supporting either the intermediate transfer unit or the chain wheels and allow conversion of the intaglio printing press from one configuration, with inspection system, to another configuration, without inspection system, and vice versa.

* * * * *